Patented Apr. 8, 1947

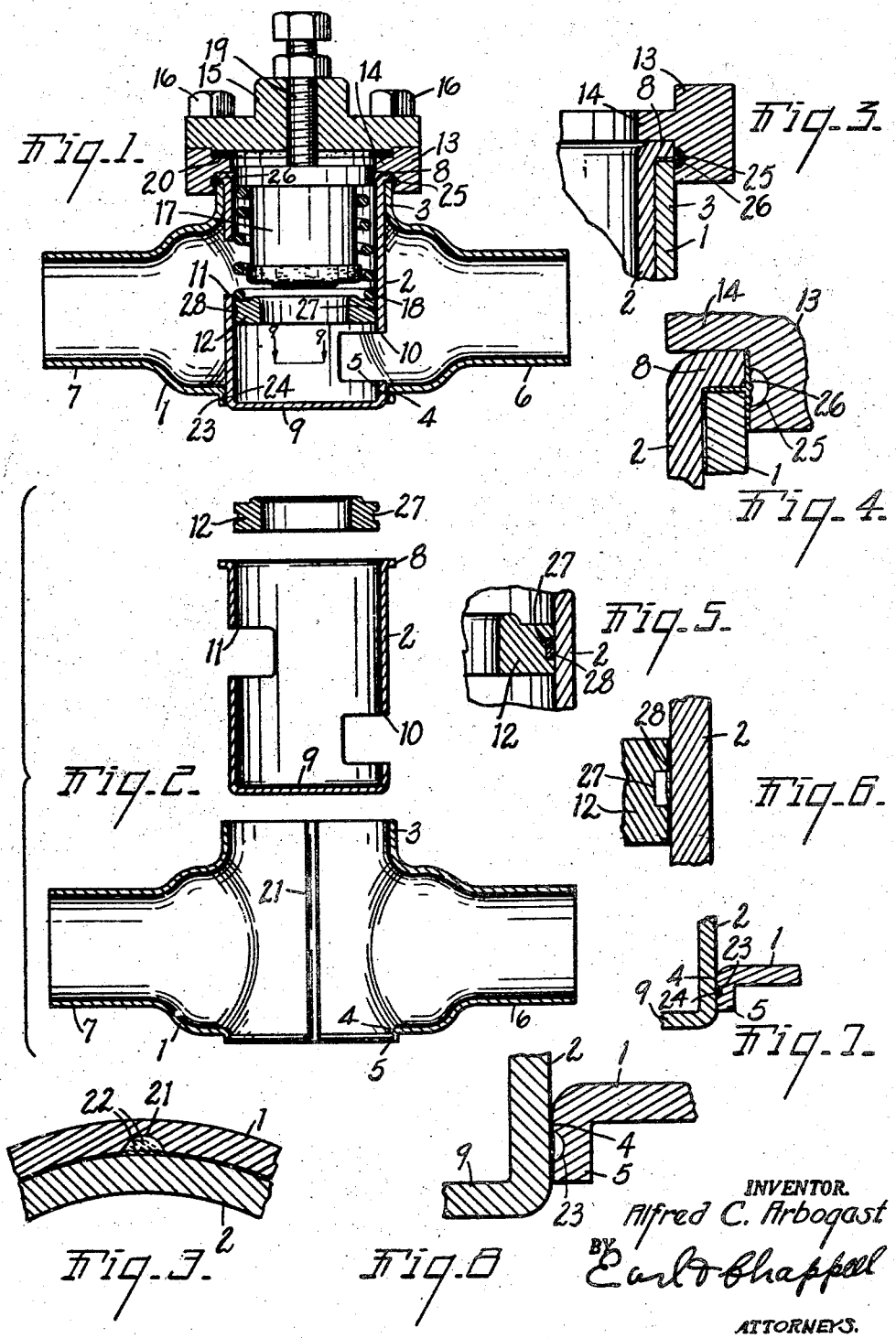

2,418,448

UNITED STATES PATENT OFFICE 2,418,448

VALVE

Alfred C. Arbogast, Elkhart, Ind., assignor to Northern Indiana Brass Company, Elkhart, Ind.

Application January 10, 1944, Serial No. 517,679

9 Claims. (Cl. 251—156)

This invention relates to improvements in valves.

The main objects of this invention are:

First, to provide a valve structure which is well adapted for the handling or controlling of various fluids, including gases such as are used in refrigerating systems, for example.

Second, to provide a valve structure the main portions of which are formed of wrought metal parts assembled in such a manner as to provide rigid fluid-tight joints between the parts.

Third, to provide a structure having these advantages in which the parts are so formed and arranged that they may be effectively assembled in mass production by relatively unskilled workmen and uniformly desirable results in the finished product.

Objects pertaining to details and economies of the invention will definitely appear from the description to follow. The invention is defined in the claims.

A structure embodying the features of the invention is illustrated in the accompanying drawing, in which:

Fig. 1 is a view mainly in vertical section of a valve structure embodying the features of my invention, the valve illustrated being of the flow regulating type and parts being shown in full lines for convenience in illustration.

Fig. 2 is a disassembled or exploded view of the outer and inner casing members and the valve seat member.

Fig. 3 is an enlarged fragmentary sectional view illustrating the assembly of certain of the parts and one of the steps in the method of manufacture.

Fig. 4 is an enlarged fragmentary sectional view corresponding to that of Fig. 3, illustrating a further step in the manufacture.

Fig. 5 is an enlarged fragmentary sectional view illustrating the relationship of the valve seat member with the inner and outer valve casing members and illustrating one of the steps in manufacture.

Fig. 6 is an enlarged fragmentary view similar to that of Fig. 5 illustrating a succeeding step in the manufacture.

Fig. 7 is a fragmentary sectional view showing the relationship of the inner and outer body members and one of the steps in manufacture.

Fig. 8 is an enlarged fragmentary view of the parts shown in Fig. 7 illustrating a succeeding step in the manufacture.

Fig. 9 is an enlarged fragmentary section on line 9—9 of Fig. 1.

In the accompanying drawing I have not attempted to illustrate proper clearances or tolerances or spaces between the parts constituting the structure. In fact, they are greatly enlarged. For example, the fit between certain parts is such as to provide a capillary space between them or a space which will result in capillary flow of the solder or brazing material. It is impractical to attempt to illustrate such space, but the flow of solder by capillary attraction in suitable so-called capillary spaces is known and understood by those skilled in the art. While for convenience I mainly use the term "brazed" in this application, it is to be understood that it is used in its broader sense, and that the terms soldering and speltering, and soldered and speltered are frequently used as synonymous for brazing and brazed.

Referring to the drawing, 1 designates an outer body member, that illustrated being of T shape or having a lateral extension or branch, and the preferred form is formed of wrought metal. Where copper valve structures are desired this member may be desirably produced by cold working a drawn tube of copper or suitable copper alloy in accordance with the method and steps disclosed in the patent to Seeber et al., No. 2,111,695, issued March 22, 1938, or the patent to Parker No. 2,027,285, issued January 7, 1936. The tubular inner body member 2 is also preferably of wrought metal and may be drawn or formed up from suitable stock. These wrought metal parts or parts produced as indicated are highly desirable in that they are not porous as are ordinary valve body castings which permit the escape of gases and certain liquids therethrough. For many requirements such for example as the handling of refrigerating gases and, in fact, in the manufacture and handling of gases generally, the escape of any quantity of gas is highly objectionable.

In the embodiment illustrated the outer body member 1 is formed with an opening 4 opposite the lateral branch or lateral extension 3 thereof, this opening having an outturned flange 5. The longitudinal arms or passage portions 6 and 7 are adapted for connection to suitable conduits or pipes not here illustrated. The inner body member 2 is of such diameter that when inserted into the lateral extension of the outer body member to extend transversely across the same and into the opening 4 thereof, the inner body member is concentrically supported relative to the lateral extension and to the flange 5 surrounding the opening and in such relationship to these surrounding parts as to provide a capillary space between them. The inner body member is provided with a flange 8 at its upper end which overhangs the end or edge of the lateral extension 3.

The inner body member has an end wall 9 at its opposite end or the end disposed in the opening in the outer body member. This end wall in effect constitutes a part of the outer wall of the valve casing when the parts are completely assembled.

The inner body member has axially spaced fluid openings 10 and 11 opening relative to the longitudinal arms or passage members 6 and 7 of the outer body member. These fluid openings are axially spaced so that the annular valve seat member 12 may be positioned within the inner body member intermediate the fluid openings thereof.

The side walls of the outer body member are so conformed and the inner body member is of such relative dimensions that a capillary space is provided between adjacent parts of these members and between the fluid openings of the inner body member. The valve seat member is of such fit in the inner body member that it is supported when assembled, that is, it has what is mechanically known as a location fit which supports it in place during the soldering or brazing operations and provides a suitable annular capillary space between the valve seat member and the surrounding wall of the inner body member.

The adapter 13 is of such dimensions as to embrace the end of the lateral extension of the outer body member and the out-turned flange 8 of the inner body member. The adapter is provided with an internal flange 14 resting on the outturned flange 8 (see Fig. 3). The cap plate 15 is secured upon the adapter by means of a lag screw 16. The valve 17 is urged from its seat by means of the coiled spring 18. An adjusting screw 19 is provided for adjusting the valve relative to its seat, the structure illustrated, as stated, being a flow regulating valve. However, it may be adjusted to its completely closed position. A gasket or packing ring 20 is provided between the head plate or cap 15 and the adapter.

Having thus described the general structure and relationship of these parts I will now point out certain details in the structure having to do primarily with the method of manufacture. It will be noted that the outer body member is formed with vertical grooves 21 in the sides thereof, these grooves being located within the capillary spaces between the inner body member and the outer body member which are located between the fluid openings of the inner body member. These channels 21 are adapted to receive strips of suitable solder or brazing material indicated at 22, Fig. 9, by dotted lines. The outturned flange 5 is provided with an annular channel or groove 23 adapted to receive a ring of solder 24 (see Figs. 7 and 8). The adapter has an annular groove 25 in the part thereof surrounding the flange 8 of the inner body member and the upper end of the lateral arm portion 3, this groove being adapted to receive a ring of soldering or brazing material 26 (see Figs. 3 and 4). The valve seat member 12 is provided with a peripheral groove 27 adapted to receive an annular piece of soldering or brazing material 28 (see Figs. 5 and 6).

In assembling the inner body member is arranged within the outer body member as shown in Fig. 1 with the soldering material 24 in the groove 23. The valve seat member is inserted within the inner body member, preferably before the inner body member is positioned within the outer body member, with the ring of soldering material 28 in position in the groove 27. The adapter is positioned as shown in Fig. 3 with the ring of soldering material 26 within the groove 25. These valve parts described are a locating fit so that it is unnecessary to secure them in position other than by fitting them together. With the parts and the solder thus assembled they are placed in a furnace and heated to such temperature as to fuse the solder. It will be understood that a suitable flux is applied to the surfaces which are to be brazed together. With the fusing of the solder it flows between the parts to be brazed or soldered together, fixedly securing them in their assembled relation and closing all joints between them.

While I have illustrated only one form of valve, namely, a flow regulating valve, it will be understood that my invention, both from the standpoint of the method and the structure, is capable of adaptation to many types of valve structures, such as angle valves, gate valves, check valves, stop cock valves, and the like. I have not attempted to illustrate or describe various modifications or adaptations which I contemplate as it is believed this disclosure will enable those skilled in the art to embody or adapt my invention as desired. As previously stated, no attempt has been made to illustrate clearances and tolerances as such illustration does not seem practical. However, the relationship of the parts has been clearly pointed out.

Having thus described my invention what I claim as new and desire to secure by Letters Patent is:

1. In a valve, the combination of a tubular outer body member having a tubular lateral extension and having a flanged opening opposite its lateral extension, a tubular inner body member disposed transversely within said outer body member and concentrically within the lateral extension thereof and the flange of said opening and spaced from said extension and flange to provide capillary spaces between them and brazed together within said spaces throughout the peripheries thereof, the inner body member having an out-turned flange at one end overlapping the end of the lateral extension of said outer body member and an end wall at its opposite end, said inner body member having axially spaced fluid openings on opposite sides thereof, each opening communicating with one end passage of the outer body member, portions of the opposite sides of the inner body member between said fluid openings being spaced relative to the adjacent side surfaces of said outer body member to provide capillary spaces, the body walls being sealingly brazed together within said spaces, an adapter collar embracing the end of the lateral extension of said outer body member and the out-turned flange of said inner body member and spaced therefrom to provide capillary spaces between them and brazed together within said spaces, and an annular valve seat member arranged concentrically within said inner body member axially intermediate of said openings and peripherally spaced from the wall thereof to provide an annular capillary space between them and brazed together within said space.

2. In a valve, the combination of a tubular outer body member having a tubular lateral extension and having a flanged opening opposite its lateral extension, a tubular inner body member disposed transversely within said outer body member and concentrically within the lateral extension thereof and the flange of said opening and spaced from said extension and flange to provide capillary spaces between them and brazed together within said spaces throughout the peripheries thereof, the inner body member having an out-turned flange at one end overlapping the end of the lateral extension of said outer body member and an end wall at its opposite end, said inner body member having axially spaced fluid openings on opposite sides thereof, each opening communicating with one end passage of the outer body member, portions of the opposite sides of the inner body member between said fluid openings being spaced relative to the adjacent side surfaces of said outer body member to provide capillary spaces, the body walls being sealingly brazed together within said spaces, an adapter collar embracing the end of the lateral extension of said outer body member and the out-turned flange of said inner body member and spaced therefrom to provide capillary spaces between them and braced together within said spaces, and a valve seat disposed axially intermediate said openings in said inner body member.

3. In a valve, the combination of a tubular outer body member having a tubular lateral extension and having a flanged opening opposite its lateral extension, a tubular inner body member disposed transversely within said outer body member and concentrically within the lateral extension thereof and the flange of said opening and spaced from said extension and flange to provide capillary spaces between them and brazed together within said spaces throughout the peripheries thereof, the inner body member having an end wall disposed within said flanged opening, said inner body member having axially spaced fluid openings on opposite sides thereof, each opening communicating with one end passage of the outer body member, portions of the opposite sides of the inner body member between said fluid openings being spaced relative to the adjacent side surfaces of said outer body member to provide capillary spaces, the body walls being sealingly brazed together within said spaces, and an annular valve seat member arranged concentrically within said inner body member axially intermediate of said openings and peripherally spaced from the wall thereof to provide an annular capillary space between them and brazed together within said space.

4. In a valve, the combination of a tubular outer body member having a tubular lateral extension and having a flanged opening opposite its lateral extension, a tubular inner body member disposed transversely within said outer body member and concentrically within the lateral extension thereof and the flange of said opening and spaced from said extension and flange to provide capillary spaces between them and brazed together within said spaces throughout the peripheries thereof, the inner body member having an end wall at its opposite end, said inner body member having axially spaced fluid openings on opposite sides thereof, each opening communicating with one end passage of the other body member, portions of the opposite sides of the inner body member between said fluid openings being spaced relative to the adjacent side surfaces of said outer body member to provide capillary spaces, the body walls being sealingly brazed together within their spaces, and a valve seat disposed axially intermediate said openings in said inner body member.

5. In a valve, the combination of a tubular outer body member having a lateral tubular extension and having an opening opposite its lateral extension, a tubular inner body member disposed transversely within said outer body member and concentrically within the lateral extension thereof and said opening and retainingly and sealingly brazed to the extension and to the edges of the opening, the inner body member having an out-turned flange at one end overlapping the end of the lateral extension of said outer body member and an end wall at its opposite end, said inner body member having axially spaced fluid openings on opposite sides thereof, each opening communicating with one end passage of the outer body member, portions of the opposite sides of the inner body member between said fluid openings being sealingly brazed to the outer body member, an adapter collar embracing the end of the lateral extension of said outer body member and the out-turned flange of said inner body member and brazed thereto, and an annular valve seat member arranged concentrically within said inner body member axially intermediate of said openings and brazed thereto.

6. In a valve, the combination of a tubular outer body member having a lateral tubular extension, a tubular inner body member disposed transversely within said outer body member and concentrically within the lateral extension thereof and sealingly brazed thereto, said inner body member having axially spaced fluid openings on opposite sides thereof, each opening communicating with one end passage of the outer body member, portions of the opposite sides of the inner body member between said fluid openings being sealingly brazed to the outer body member, an adapter collar embracing the end of the lateral extension of said outer body member and the end of said inner body member and brazed thereto, and an annular valve seat member arranged within said inner body member axially intermediate of said openings and brazed thereto.

7. In a valve, the combination of a tubular outer body member having a tubular lateral extension, a tubular inner body member disposed transversely within said outer body member and concentrically within the lateral extension thereof and peripherally brazed thereto, the inner body member having an out-turned flange overlapping the end of the lateral extension of said outer body member, said inner body member having axially spaced fluid openings on opposite sides thereof, each opening communicating with an end passage of the outer body member, portions of the opposite sides of the inner body member between said fluid openings being sealingly brazed to the outer body member, an adapter collar embracing the end of the lateral extension of said outer body member and the out-turned flange of said inner body member and brazed thereto, and an annular valve seat member arranged within said inner body member axially intermediate of said openings and brazed thereto.

8. In a valve, the combination of a tubular outer body member having a tubular lateral extension, a tubular inner body member disposed transversely within said outer body member and concentrically within the lateral extension thereof and peripherally brazed thereto, the inner body member having an out-turned flange overlapping the end of the lateral extension of said outer body member, said inner body member having axially spaced fluid openings on opposite sides thereof, each opening communicating with an end passage of the outer body member, portions of the opposite sides of the inner body member between said fluid openings being sealingly brazed to the outer body member, and an annular valve seat member arranged within said inner body member axially intermediate of said openings and brazed thereto.

9. In a valve, the combination of a tubular outer body member having a tubular lateral extension, a tubular inner body member disposed transversely within said outer body member to project therefrom and concentrically within the lateral extension thereof and peripherally brazed thereto, said inner body member having axially spaced fluid openings on opposite sides thereof, each opening communicating with an end passage of the outer body member, portions of the opposite sides of the inner body member between said fluid openings being sealingly brazed to the outer body member, an adapter collar embracing the end of the lateral extension of said outer body member and said inner body member and brazed thereto, and an annular valve seat member arranged within said inner body member axially intermediate of said openings and brazed thereto.

ALFRED C. ARBOGAST.

REFERENCES CITED

The following references are of record in the file of this patent:

UNITED STATES PATENTS

| Number | Name | Date |
|---|---|---|
| 1,935,329 | Needham | Nov. 14, 1933 |
| 2,301,176 | Elliott | Nov. 10, 1942 |
| 2,034,418 | Plant | Mar. 17, 1936 |
| 2,122,957 | Santamaria | July 5, 1938 |
| 1,801,171 | Mueller | Apr. 14, 1931 |
| 2,084,207 | Lindquist | June 15, 1937 |

FOREIGN PATENTS

| Number | Country | Date |
|---|---|---|
| 374,574 | British | 1932 |